(12) United States Patent
Stutika et al.

(10) Patent No.: US 10,336,232 B2
(45) Date of Patent: Jul. 2, 2019

(54) TRACK ASSEMBLY

(71) Applicant: Lear Corporation, Sourthifled, MI (US)

(72) Inventors: Peter Stutika, Presov (SK); Peter Necej, Presov (SK); Martin Kravcik, Presov (SK); Jan Hrinak, Presov (SK); Marian Podhorsky, Presov (SK); Peter Biath, Presov (SK)

(73) Assignee: Lear Corporation, Southfield, MI (US)

( * ) Notice: Subject to any disclaimer, the term of this patent is extended or adjusted under 35 U.S.C. 154(b) by 71 days.

(21) Appl. No.: 15/782,424

(22) Filed: Oct. 12, 2017

(65) Prior Publication Data

US 2019/0111811 A1     Apr. 18, 2019

(51) Int. Cl.
*F16M 13/00* (2006.01)
*B60N 2/90* (2018.01)
*B60N 2/07* (2006.01)

(52) U.S. Cl.
CPC ........... *B60N 2/933* (2018.02); *B60N 2/0715* (2013.01); *B60N 2002/952* (2018.02)

(58) Field of Classification Search
CPC . B60N 2/933; B60N 2/0715; B60N 2002/952
USPC ....... 248/429, 424; 296/65.01, 65.13, 65.15; 297/317, 341, 344.1, 378.12
See application file for complete search history.

(56) References Cited

U.S. PATENT DOCUMENTS

| | | | |
|---|---|---|---|
| 4,639,038 A | 1/1987 | Heling | |
| 5,597,206 A * | 1/1997 | Ainsworth | B60N 2/0705 297/317 |
| 6,098,946 A * | 8/2000 | Sechet | B60N 2/0705 248/424 |
| 7,097,250 B2 * | 8/2006 | Rausch | B60N 2/123 297/341 |
| 8,800,949 B2 | 8/2014 | Schebaum et al. | |
| 9,776,532 B2 | 10/2017 | Stutika et al. | |
| 10,023,077 B1 * | 7/2018 | Stutika | B60N 2/0722 |
| 2015/0042140 A1 * | 2/2015 | Utzinger | B60N 2/0818 297/344.1 |
| 2015/0083882 A1 * | 3/2015 | Stutika | B60N 2/0722 248/429 |
| 2017/0240067 A1 * | 8/2017 | Stutika | B60N 2/0818 |

* cited by examiner

*Primary Examiner* — Todd M Epps
(74) *Attorney, Agent, or Firm* — Fishman Stewart PLLC

(57) ABSTRACT

A track adjuster includes a first track, a second track movably connected to the first track, a lockset connected to at least one of the first track and the second track, and an easy adjusting assembly. A lockset may be configured to selectively lock the first track and the second track together. An easy entry assembly may include an actuating lever, a locking lever engaged with the actuating lever, and a lock stop connected to the first track. A lock stop may be configured to engage the locking lever. An easy adjusting assembly may be configured to restrict locking of the first track and the second track by the lockset.

20 Claims, 17 Drawing Sheets

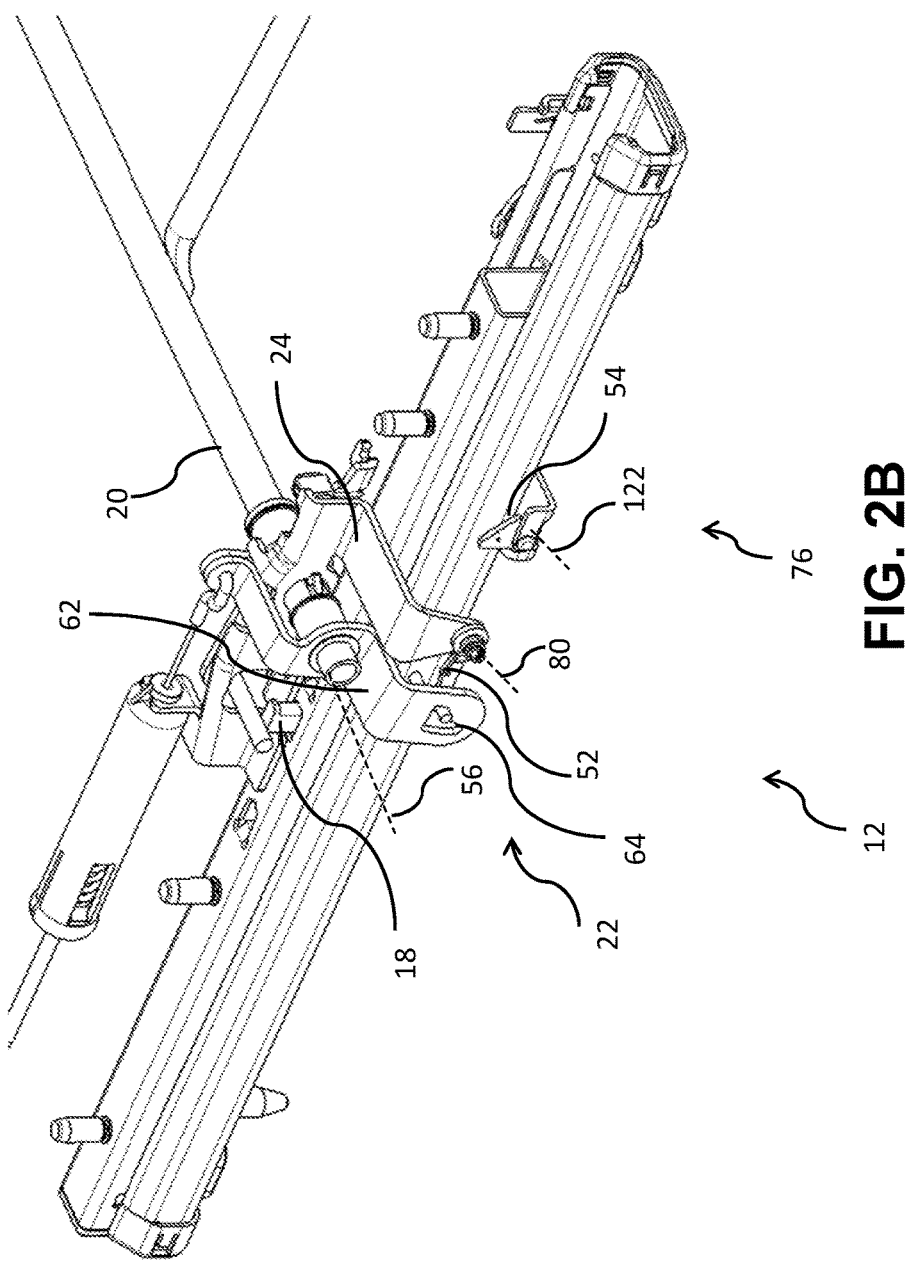

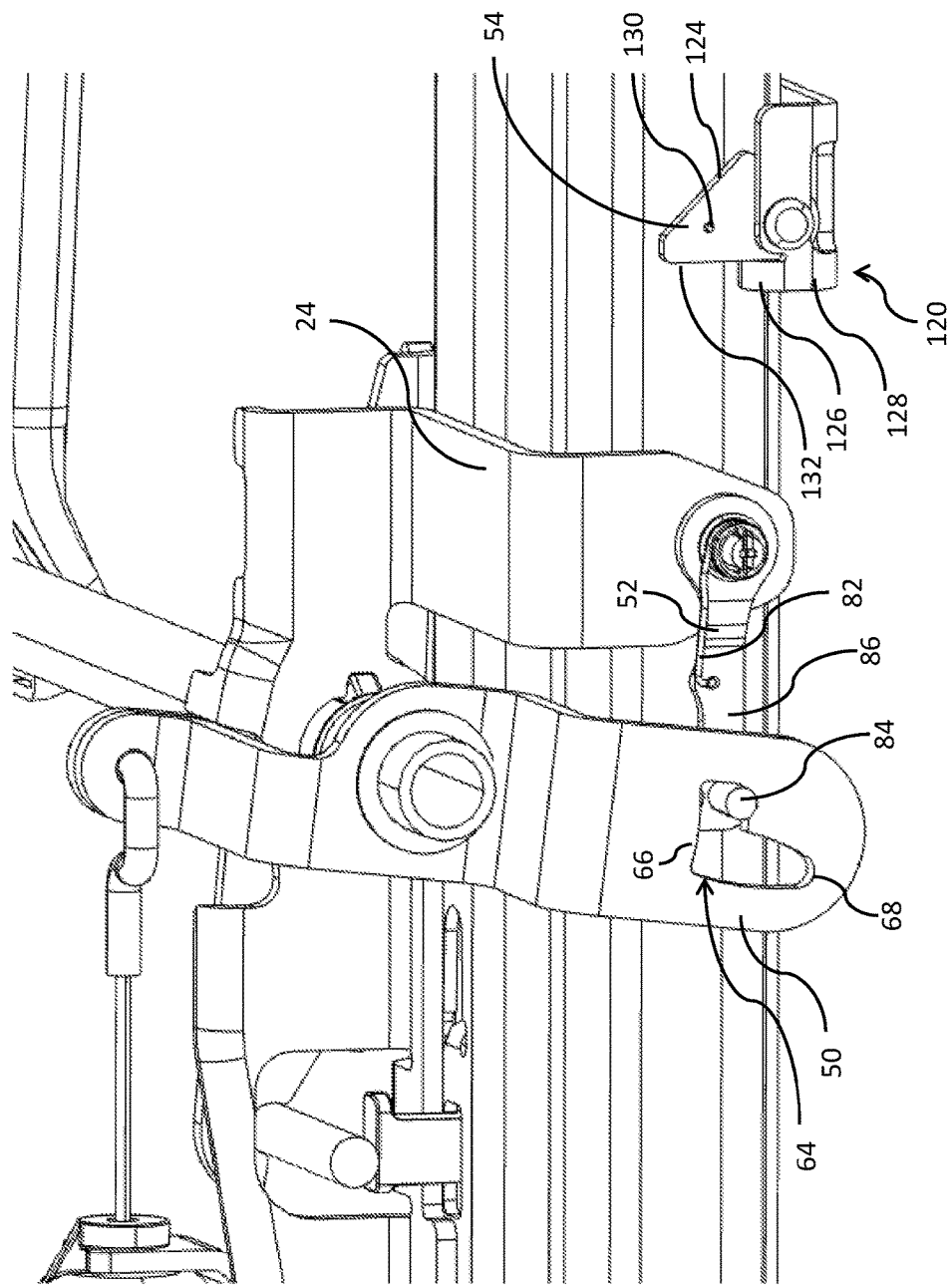

TRACK ASSEMBLY

TECHNICAL FIELD

The present disclosure generally relates to track assemblies and adjusters, including track assemblies and adjusters that may be used in connection with vehicles, seats, and/or vehicle seats.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some track assembly designs include easy adjusting or easy entry functionality that may, for example, facilitate access to rear seats in a vehicle. Some easy adjusting or easy entry designs may be relatively complex and/or expensive.

There is a desire for solutions/options that minimize or eliminate one or more challenges or shortcomings of track assemblies and adjusters. The foregoing discussion is intended only to illustrate examples of the present field and should not be taken as a disavowal of scope.

SUMMARY

In embodiments, a track adjuster may include a first track, a second track movably connected to the first track, a lockset connected to at least one of the first track and the second track, and an easy adjusting assembly. A lockset may be configured to selectively lock the first track and the second track together. An easy entry assembly may include an actuating lever, a locking lever engaged with the actuating lever, and a lock stop connected to the first track. A lock stop may be configured to engage the locking lever. An easy adjusting assembly may be configured to restrict locking of the first track and the second track by the lockset. A lock stop may be biased to rotate about an axis perpendicular to the first track. A locking lever may include a protrusion extending into a slot of the actuating lever. A protrusion may be configured to engage the lock stop. In at least one relative position between the first track and the second track, a body of the locking lever may be disposed at least partially between the actuating lever and the lock stop. A slot of an actuating lever may include a first section and a second section, and the first section may be disposed substantially perpendicularly to the second section. A lock stop may include an angled portion that may be angled upward and rearward at an oblique angle.

In embodiments, an actuating lever, a locking lever, and a lock stop may be configured to rotate about three different axes that are disposed substantially in parallel with each other. A lock stop may be rotatably connected to a bracket fixed to the first track. A bracket may include a projection configured to limit rotation of the lock stop. A lock stop may be biased into contact with the projection. An end stop may be rotatably connected to the first track. An end stop may be configured to restrict movement of the second track relative to the first track in a first direction via engagement with the actuating lever. An end stop may be configured to rotate such that the end stop does not restrict movement of the second track relative to the first track in a second direction. An end stop may be disposed at a first side of the first track and a lock stop may be disposed at a second side of the first track. In a first position, a locking lever may not restrict movement of the actuating lever. In a second position, a locking lever may restrict movement of the actuating lever. In the first position, a protrusion of the locking lever may be disposed in a first section of a slot of the actuating lever. In the second position, the protrusion of the locking lever may be disposed in a second section of the slot of the actuating lever. The first section and the second section may be disposed substantially perpendicular to each other. A cable may be connected to the actuating lever and may be configured to cause rotation of the actuating lever. An easy adjusting assembly may be configured to restrict locking of the first track and the second track in a comfort range of positions and in an easy adjusting range of positions.

With embodiments, an easy adjusting assembly may include an actuating lever including a slot, a locking lever engaged with the slot of the actuating lever, and/or a rotating lock stop. A rotating lock stop may include an angled portion configured to cause the locking lever to move from a first section of the slot to a second section of the slot. The locking lever may be configured to restrict movement of the actuating lever to restrict locking of a track assembly in an easy adjusting range of track positions.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIGS. 2A and 2B are perspective views of an embodiment of a locked track adjuster in a comfort range according to teachings of the present disclosure.

FIG. 2C is a perspective view of portions of an embodiment of a locked track adjuster, including a actuating lever, a locking lever, and a lock stop, in a comfort range according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
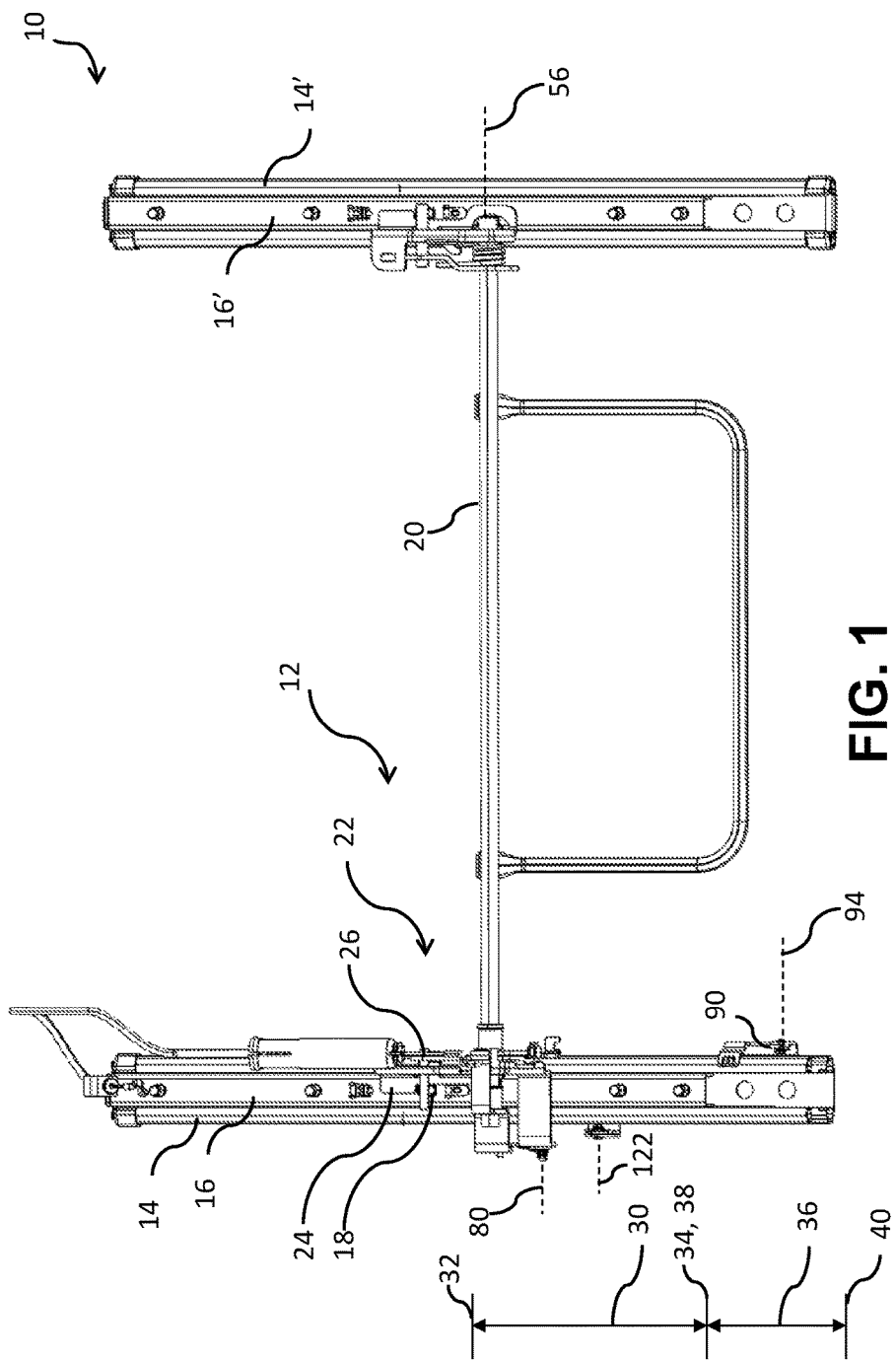
FIG. 1 is a top view generally illustrating an embodiment of a track assembly including a track adjuster according to teachings of the present disclosure.
Figure 2A:
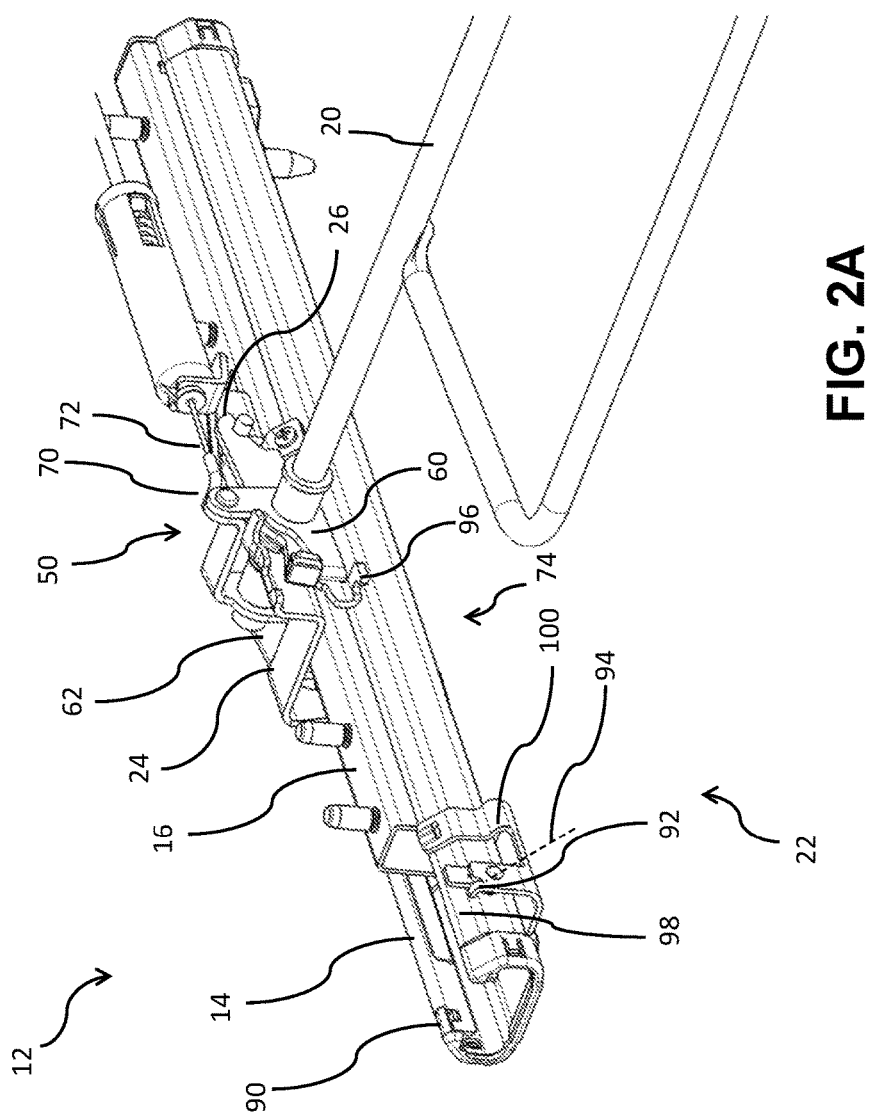
Figure 2D:
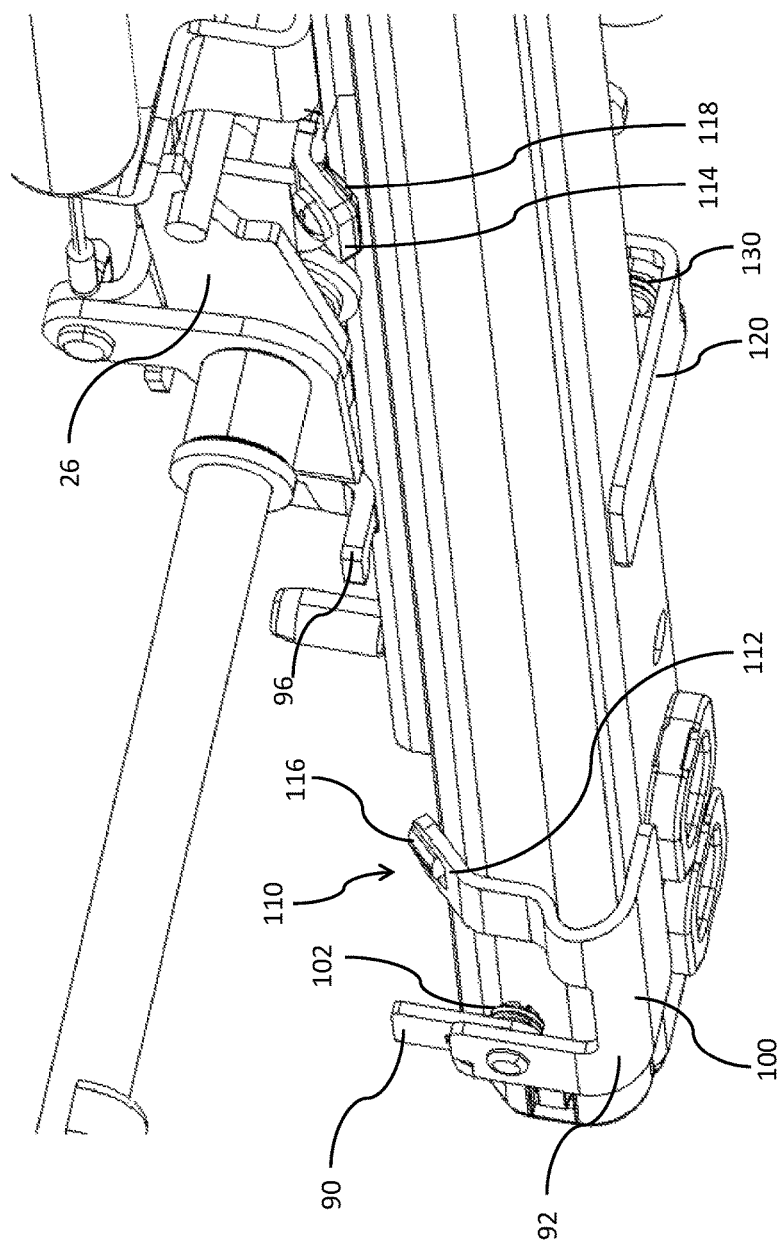
FIG. 2D is a perspective view of portions of an embodiment of a locked track adjuster, including an end stop, in a comfort range according to teachings of the present disclosure.
Figure 3A:
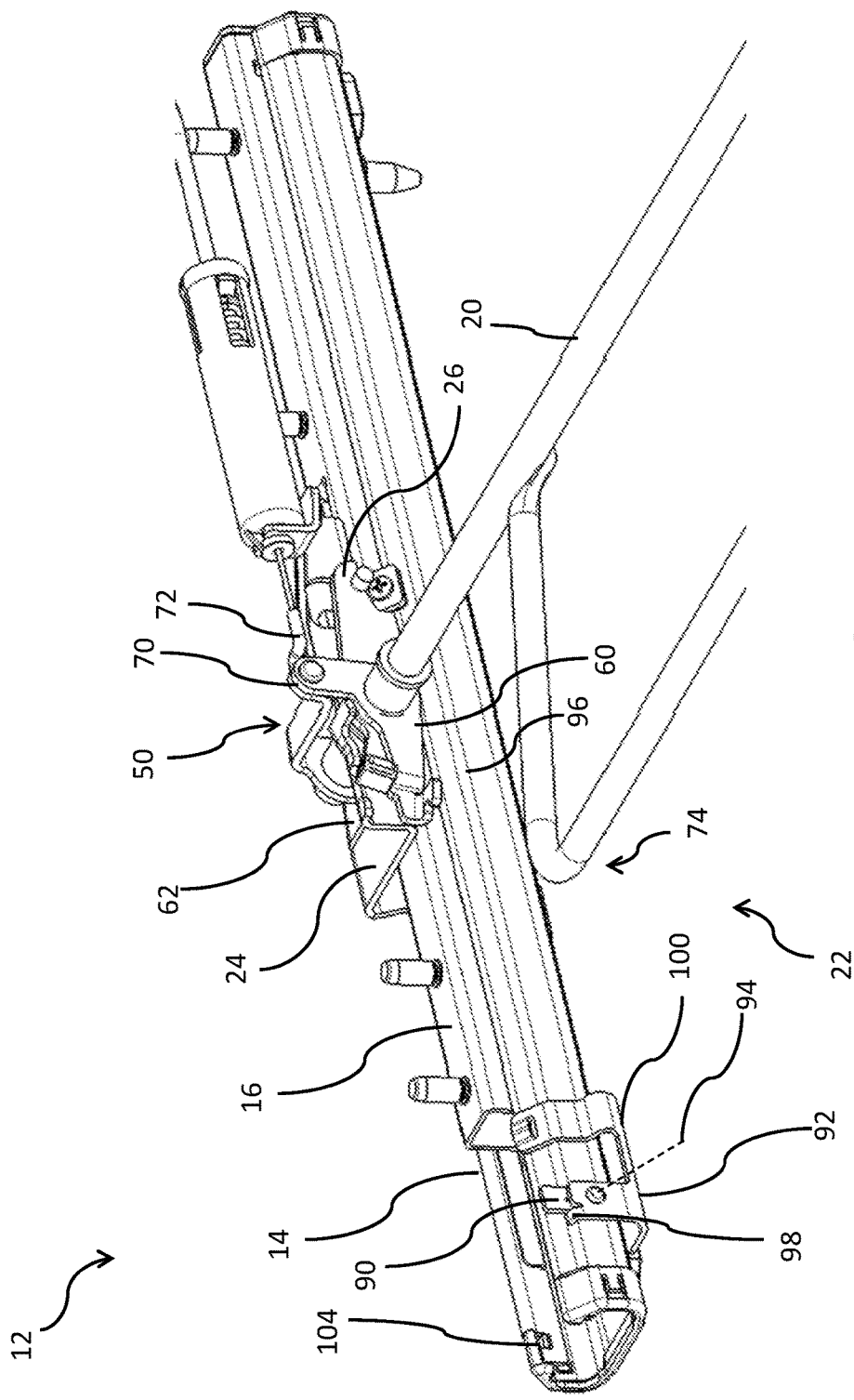
FIGS. 3A and 3B are perspective views of an embodiment of an unlocked track adjuster in a comfort range with an activated easy adjusting assembly according to teachings of the present disclosure.
Figure 3B:
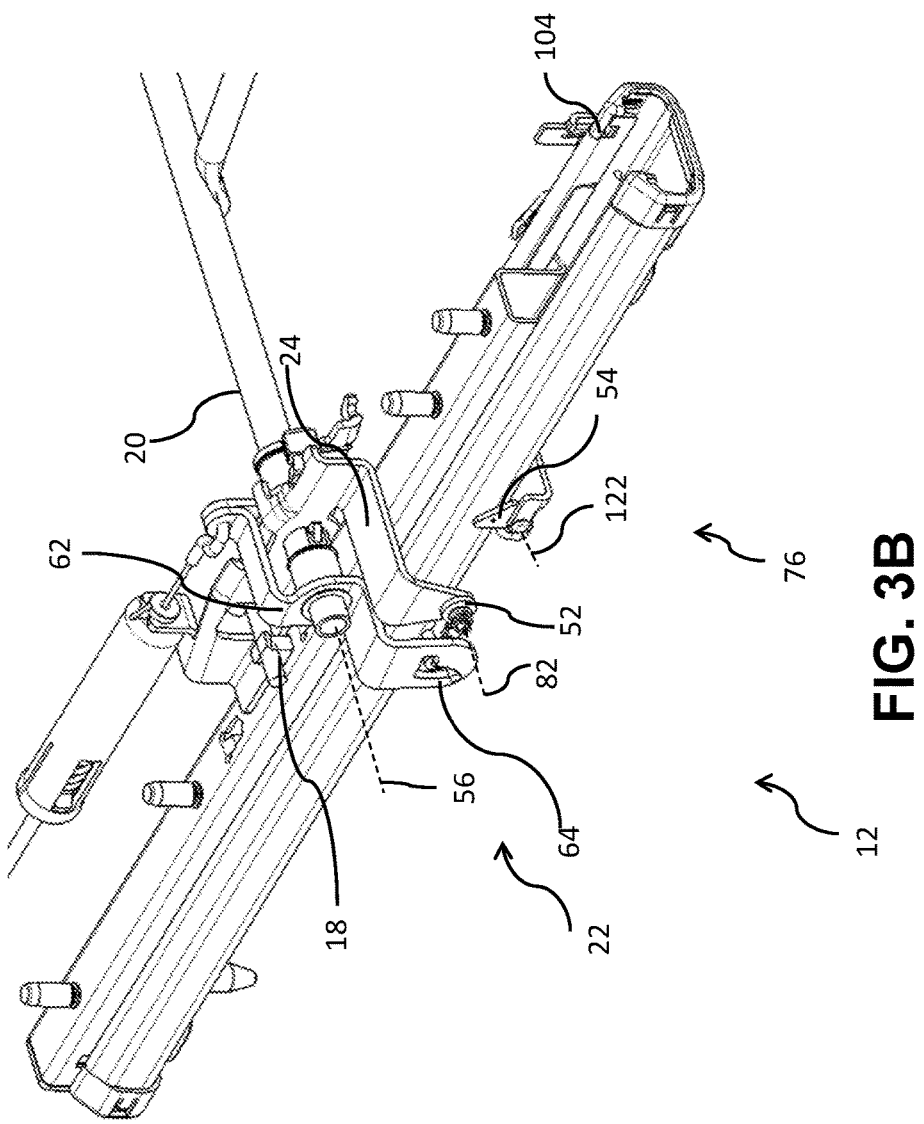
Figure 4A:
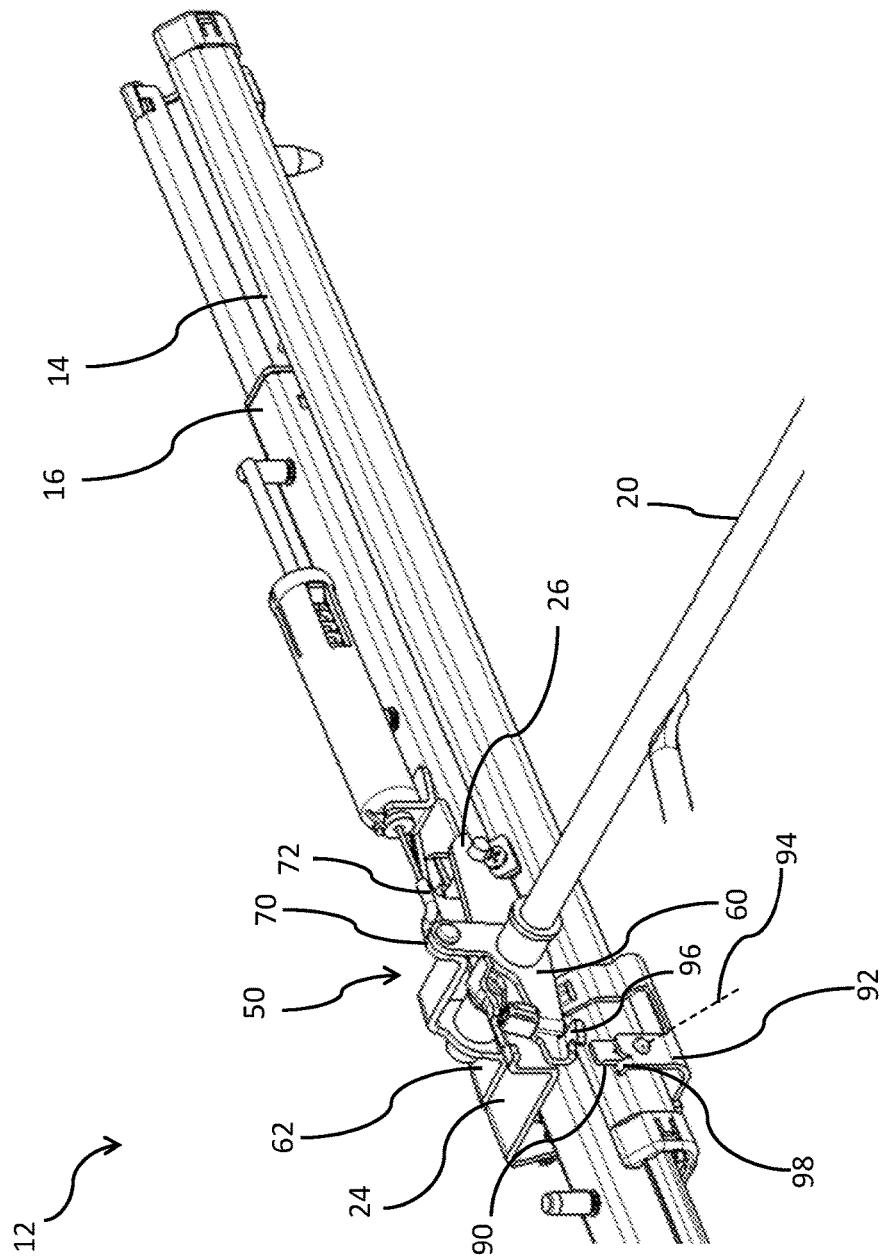
FIGS. 4A and 4B are perspective views of an embodiment of an unlocked track adjuster at an end of a comfort range with an activated easy adjusting assembly according to teachings of the present disclosure.
Figure 4B:
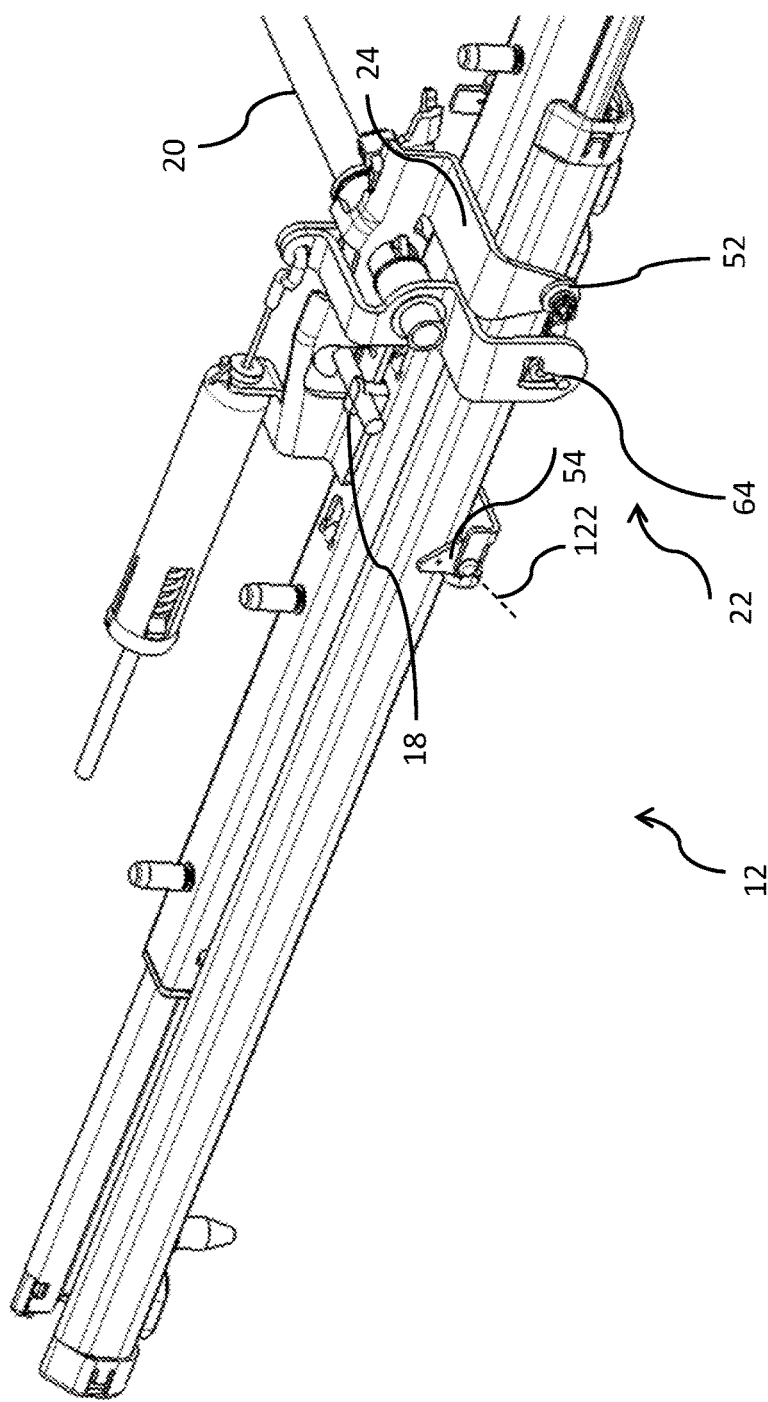
Figure 5A:
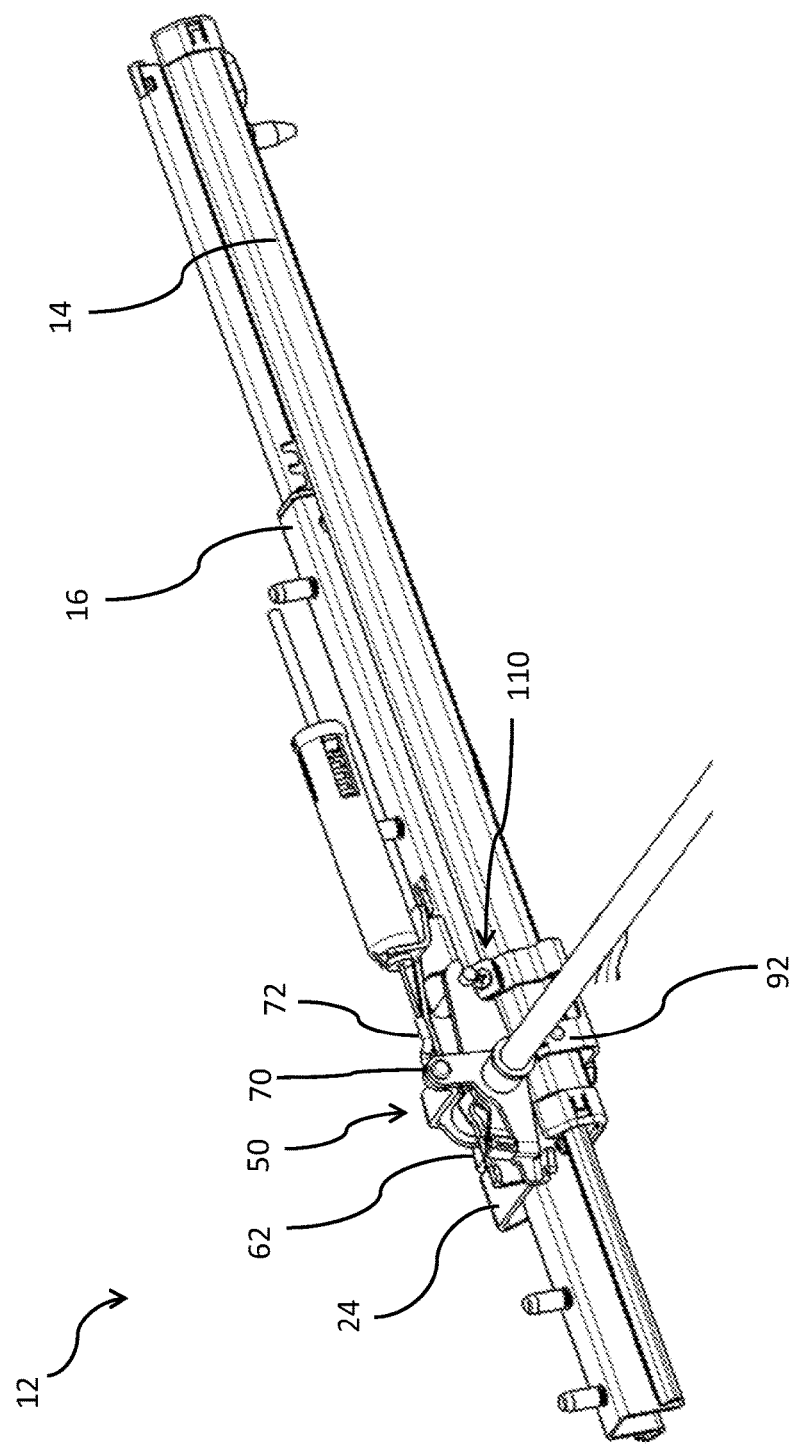
FIGS. 5A and 5B are perspective views of an embodiment of an unlocked track adjuster at an end of an easy adjusting range with an activated easy adjusting assembly according to teachings of the present disclosure.
Figure 5B:
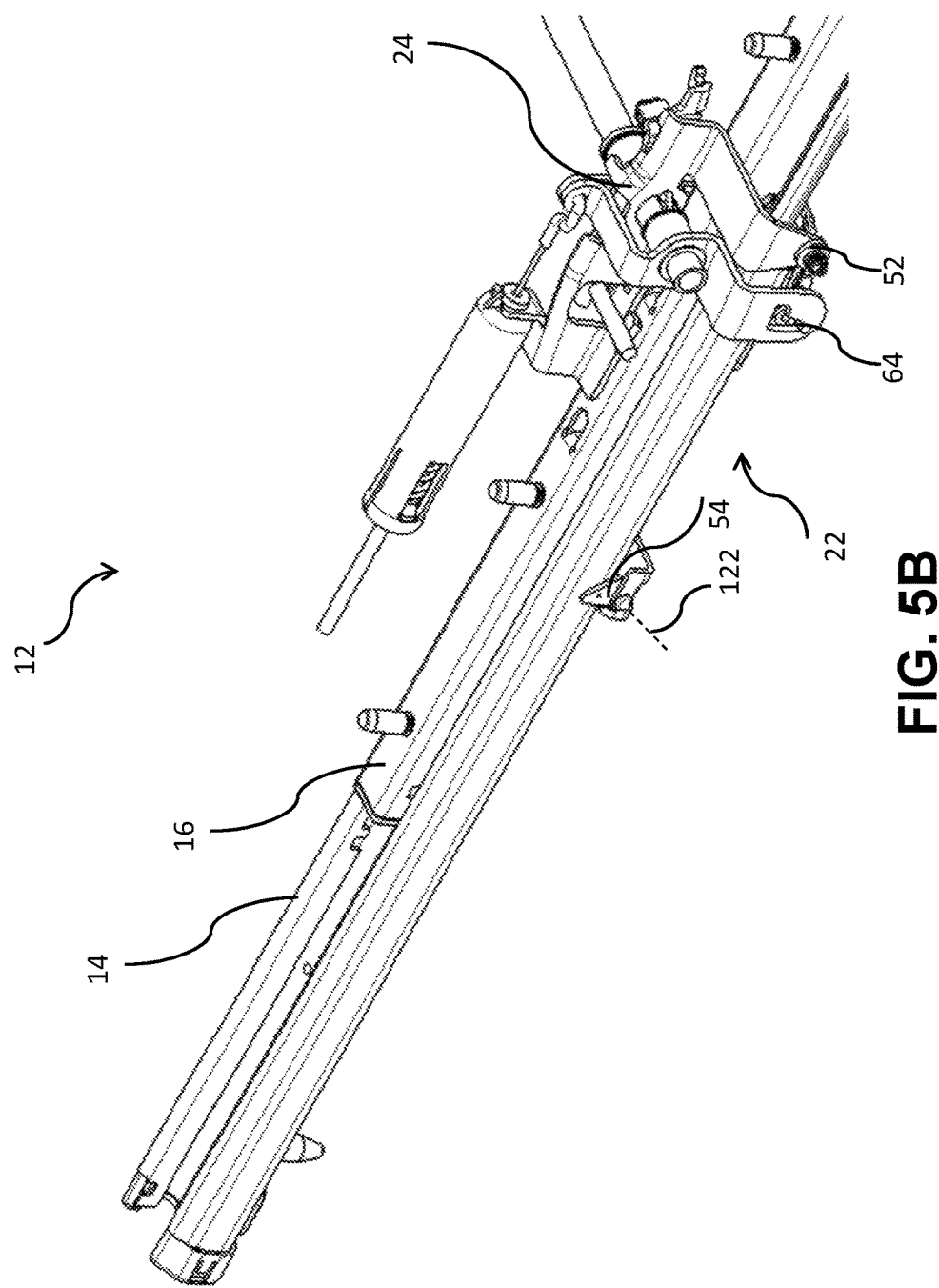
Figure 6A:
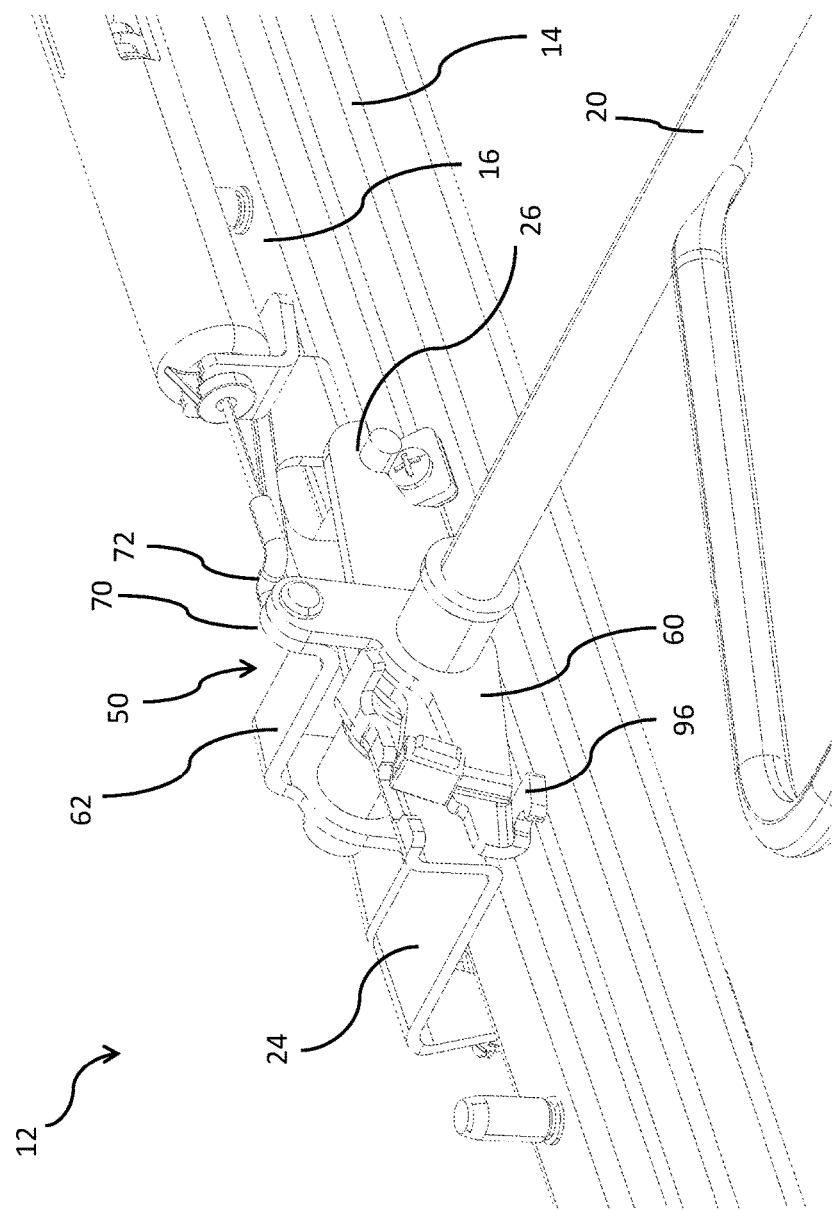
FIGS. 6A and 6B are perspective views of an embodiment of an unlocked track adjuster in a comfort range with a partially activated easy adjusting assembly according to teachings of the present disclosure.
Figure 6B:
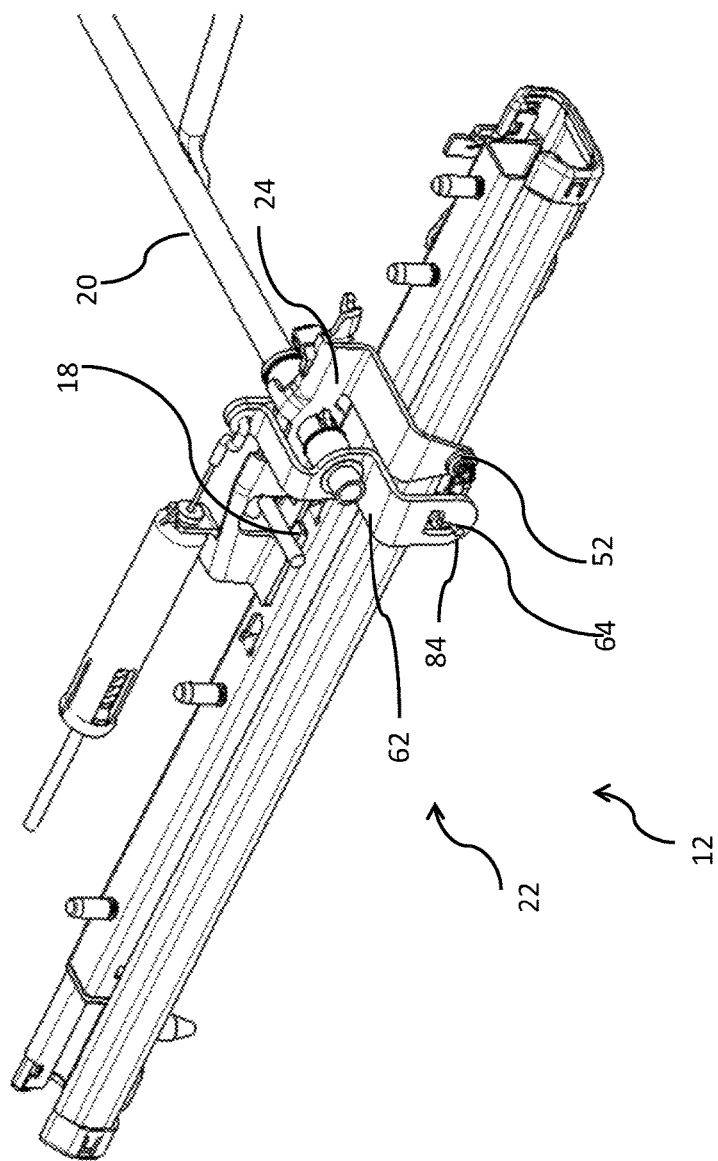
Figure 7A:
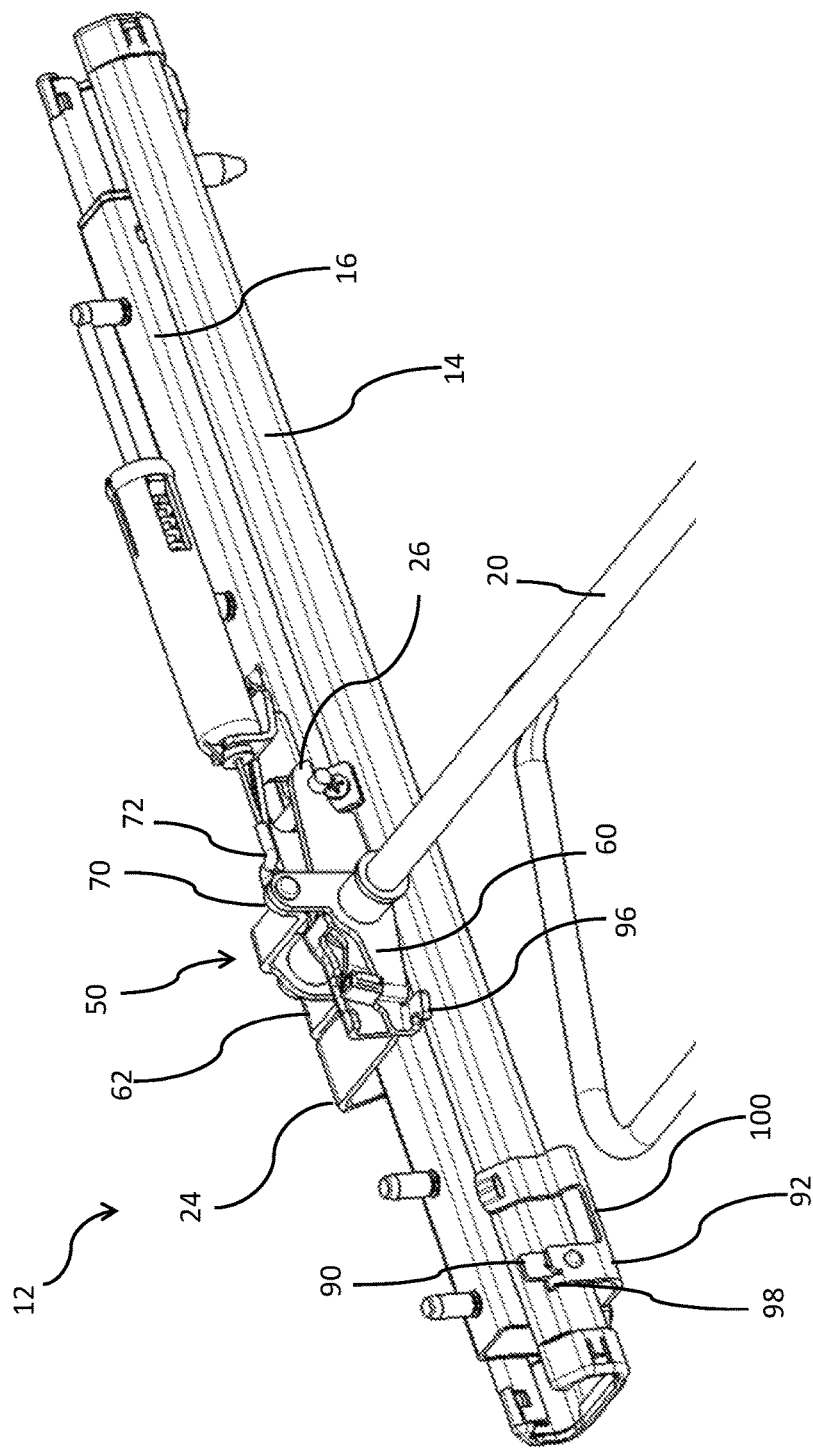
FIGS. 7A and 7B are perspective views of an embodiment of an unlocked track adjuster in a comfort range with a partially activated easy adjusting assembly according to teachings of the present disclosure.
Figure 7B:
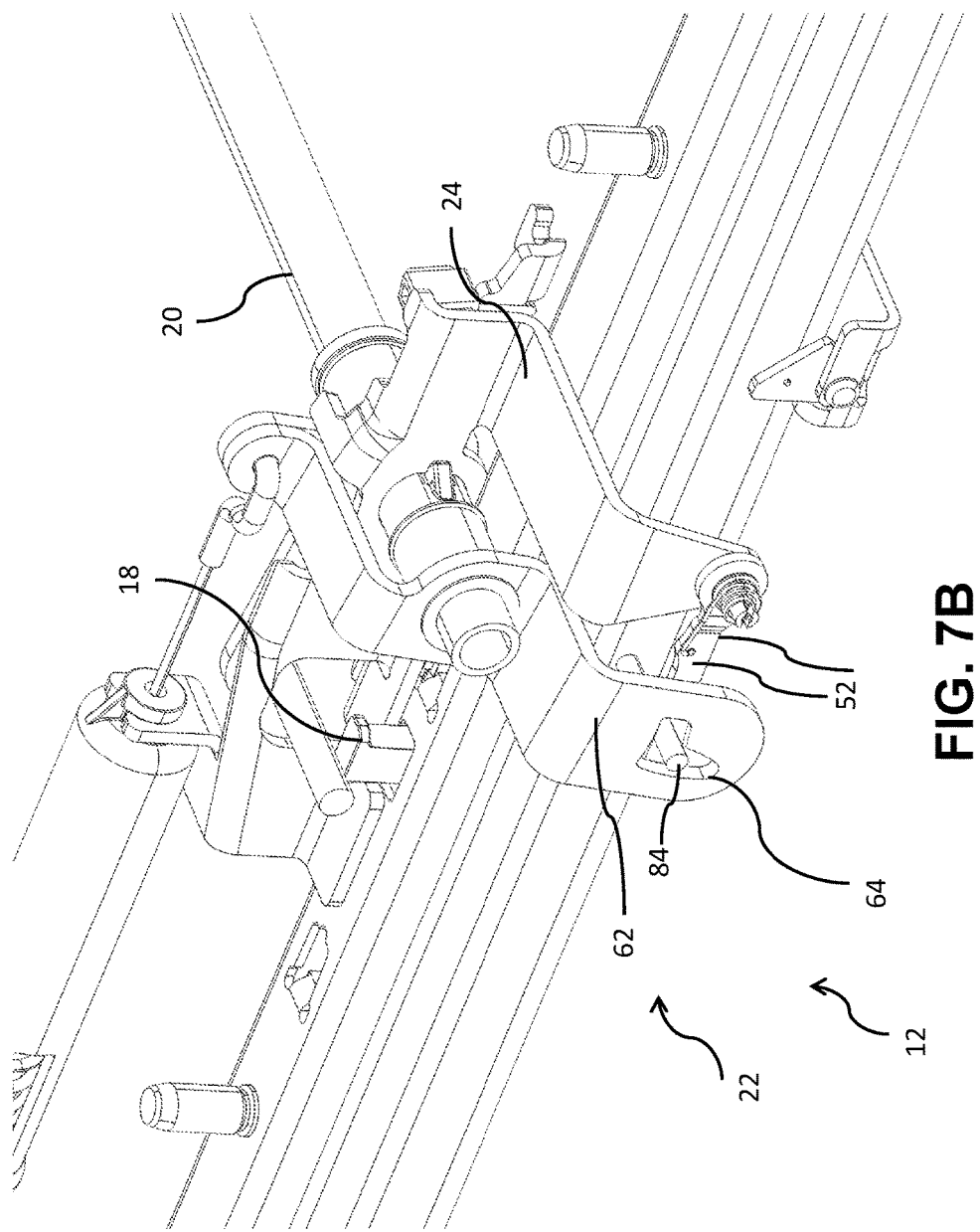
Figure 8A:
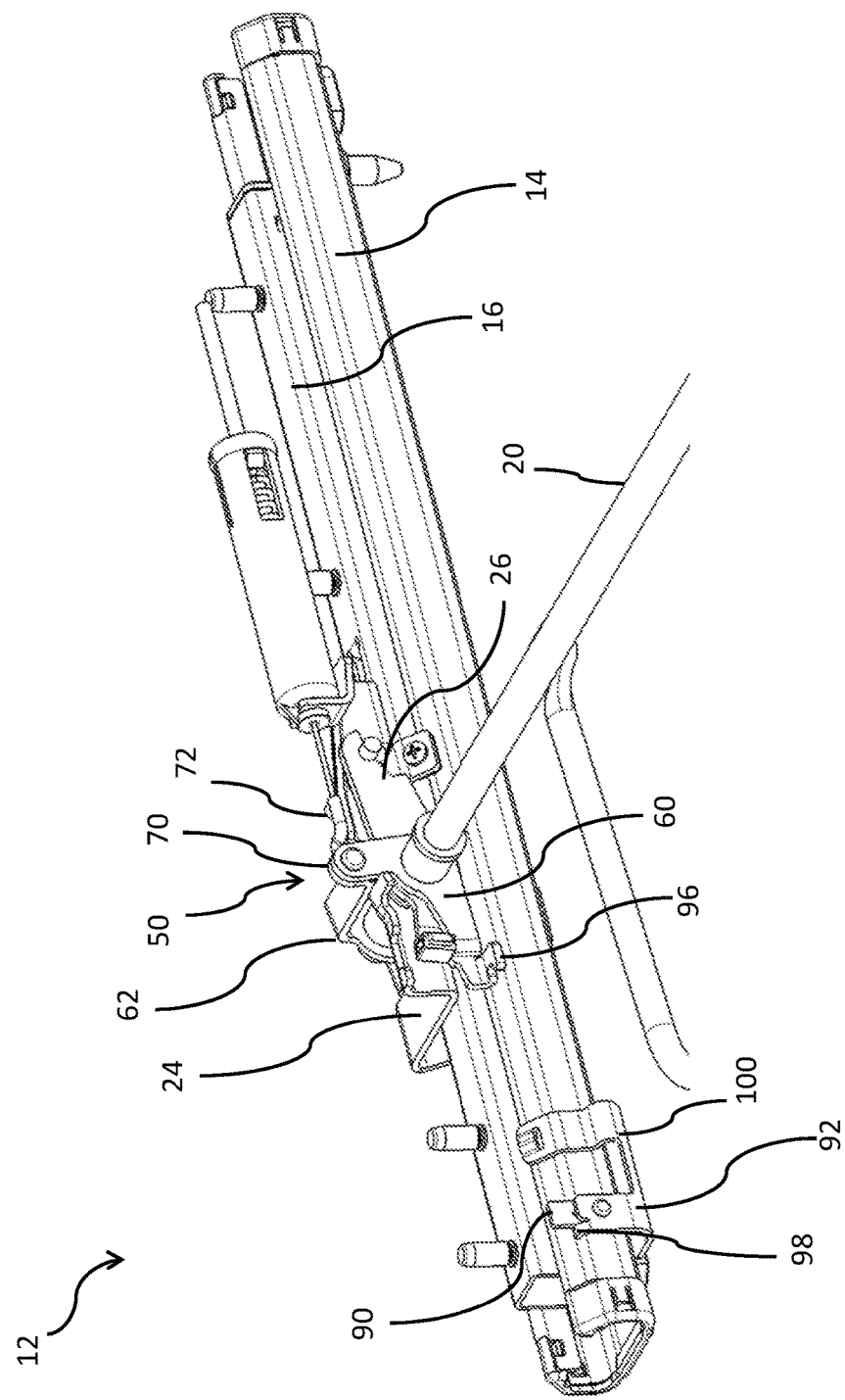
FIGS. 8A and 8B are perspective views of an embodiment of a locked track adjuster in a comfort range with an unactivated easy adjusting assembly according to teachings of the present disclosure.
Figure 8B:
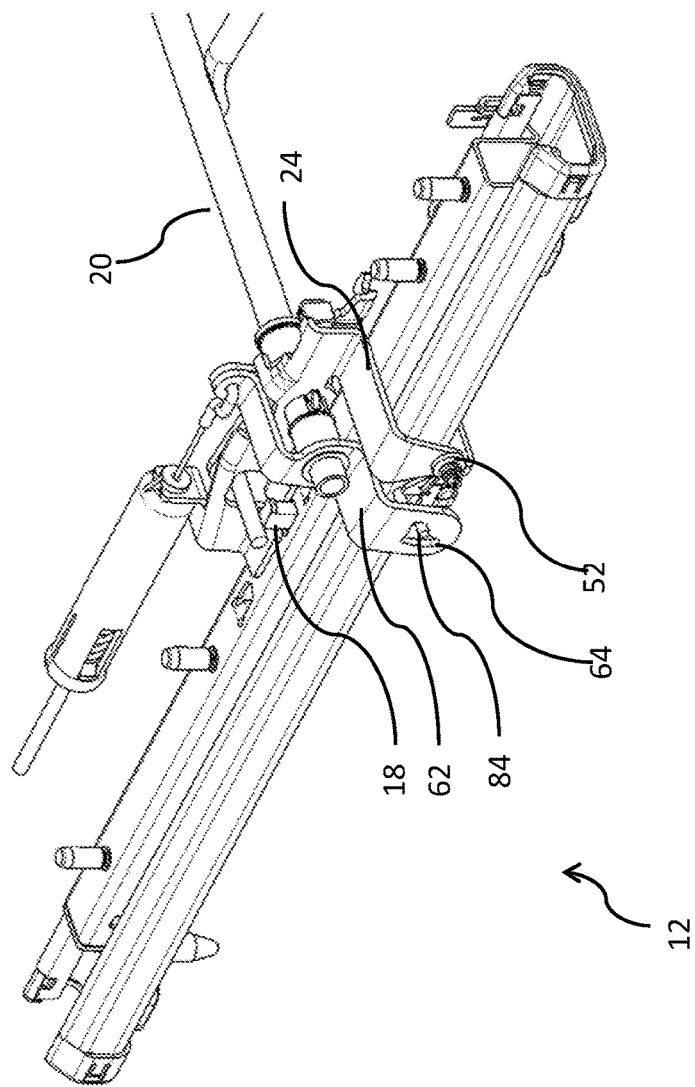

In embodiments, such as generally illustrated in FIGS. 1, 2A, and 2B, a track assembly 10 may include a first track 14, a second track 16, and/or a track adjuster 12. A track adjuster 12 may include a lockset 18, a cross member 20, and/or an easy adjusting assembly 22. First track 14 and second track 16 may be movably connected to each other. For example and without limitation, second track 16 may be configured to slide along first track 14. Lockset 18 may be configured to selectively restrict and/or prevent relative movement between first track 14 and second track 16. Lockset 18 may be disposed substantially between first track 14 and second track 16. A base bracket 24 may be connected to second track 16 and may move with second track 16. Cross member 20 may be connected to second track 16 via base bracket 24. Track assembly 10 may include a third track 14' and a fourth track 16' that may be configured to move relative to third track 14'. Cross member 20 may be connected to fourth track 16'.

In embodiments, a lockset lever 26 may be connected to cross member 20 such that rotation of lockset lever 26 may cause rotation of cross member 20 and rotation of cross member 20 may cause rotation of lockset lever 26. Lockset lever 26 may be configured to contact and/or actuate (e.g., directly) lockset 18, such as via rotation of cross member 20 and/or actuation via easy adjusting assembly 22, to selectively lock first track 14 and second track 16 together. For example and without limitation, lockset 18 may be biased into a locking position and actuation of lockset 18 may unlock first track 14 and second track 16.

In embodiments, first track 14 and second track 16 may include a first range 30 of relative positions (e.g., a comfort or design range) and a second range 36 of relative positions (e.g., an easy adjusting range). First range 30 may include a first/rear end 32 and a second/front end 34. First range 30 may, for example and without limitation, include a length of about 150 mm. Second range 36 may include a first/rear end 38 and a second/front end 40. Second range 36 may, for example and without limitation, a length of about 60 mm. A combined length of first range 30 and second range 36 may, for example and without limitation, be about 210 mm, which may correspond to a total adjustment length for track assembly 10. First range 30 may be disposed rearward of second range 36. Second end 34 of first range 30 and first end 38 of second range 36 may be substantially coincident.

With embodiments, such as generally illustrated in FIGS. 1, 2A, 2B, 2C, and 2D, an easy adjusting assembly 22 may be connected to and/or utilized in connection with a track adjuster 12. An easy adjusting assembly 22 may include an actuating lever 50, a locking lever 52, a lock stop 54, and/or an end stop 90. Actuating lever 50 may be connected to cross member 20 and/or may be configured to rotate cross member 20, such as about a first axis 56. For example and without limitation, actuating lever 50 may be connected to cross member 20 such that actuating lever 50 and cross member 20 may rotate relative to each other, and actuating lever 50 may engage lockset lever 26 to actuate lockset 18. Actuating lever 50 may rotate relative to cross member 20 and/or may cause cross member 20 to rotate via lockset lever 26. For example and without limitation, a first portion 60 of actuating lever 50 may be configured to engage lockset lever 26 to cause rotation of lockset lever 26 (see, e.g., FIG. 2A). Lockset lever 26 may rotate and may directly engage and/or actuate lockset 18 to selectively lock first track 14 and second track 16 together.

With embodiments, an actuating lever 50 may include a connection portion 70 that may be configured for connection with a connecting member 72, such as a Bowden cable. Connecting member 72 may be actuated to engage/activate easy adjusting assembly 22, such as via rotation of a seat back and/or actuation of an easy adjusting actuator (e.g., an easy adjusting handle). Connection portion 70 may include some of first portion 60 and/or second portion 62. With embodiments, first portion 60 may be disposed substantially at a first side (e.g., an outer side) 74 of first and second tracks 14, 16 and second portion 62 may be disposed substantially at a second side (e.g., an inner side) 76 of first and second tracks 14, 16. First portion 60 and second portion 62 may be connected together, such as via connecting member 72, and may rotate together, such as upon actuation by connecting member 72. For example and without limitation, first portion 60 and second portion 62 may be disposed in a generally U-shaped configuration that may open downward toward and/or at least partially receive first track 14 and/or second track 16.

In embodiments, such as generally illustrated in FIGS. 2B and 2C, a second portion 62 of actuating lever 50 may include a slot 64 that may extend through second portion 62. Slot 64 may include a first section 66 and/or a second section 68. First section 66 and second section 68 may be disposed substantially perpendicularly to each other. For example and without limitation, first section 66 may be disposed substantially horizontally and second section 68 may be disposed substantially vertically.

In embodiments, a locking lever 52 may be connected to second track 16, such as via a base bracket 24. Locking lever 52 may be rotatably connected to base bracket 24 and may be configured to rotate about a second axis 80. A biasing member 82, such as a spring, may be connected to locking lever 52 and/or may bias locking lever 52 in a first direction (e.g., counterclockwise in FIG. 2C).

With embodiments, such as generally illustrated in FIGS. 2B and 2C, a locking lever 52 may include a protrusion 84 that may extend substantially perpendicularly from a body 86 of locking lever 52. Protrusion 84 may include, for example, a substantially cylindrical shape. Protrusion 84 may extend from body 86 toward actuating lever 50 and may extend into and/or be engaged with slot 64 of second portion 62 of actuating lever 50. If easy adjusting assembly 22 is not activated, protrusion 84 may be disposed in first section 66 of slot 64 and/or may not materially affect rotation of actuating lever 50. If actuating lever 50 is rotated (e.g., if easy adjusting assembly 22 is activated), locking lever 52 may rotate such that protrusion 84 may move within slot 64 from first section 66 into second section 68. While protrusion 84 is disposed in second section 68, protrusion 84 may restrict and/or prevent rotation of actuating lever 50 (see, e.g., FIGS. 3B, 4B, 5B, and 6B). For example and without limitation, while protrusion 84 is disposed in second section 68, protrusion 84 may hold actuating lever 50 in an activated position, which may restrict or prevent unlocking of lockset 18 (e.g., may keep lockset lever 26 engaged with lockset 18). Locking 52 lever may restrict locking of lockset 18 regardless of whether actuating lever 50 or lockset 18 is otherwise actuated, such as by a user. For example and without limitation, locking lever 52 may automatically prevent and continue to prevent locking of first track 14 and second track 16 once easy adjusting assembly 22 has been activated. Locking lever 52 may prevent locking of first track 14 and second track 16 in some or all of first range 30 and/or second range 36.

With embodiments, such as generally illustrated in FIGS. 1, 2A, and 2D, 3A, 4A, 5A, 6A, 7A, and 8A, a track adjuster 12 may include an end stop 90 that may be disposed at or about second end 34 of first range 30 and/or first end 38 of second range 36. End stop 90 may be rotatably connected to first track 14, such as via an end stop bracket 92 that may be connected to first track 14 at or about second end 34 of first range 30 and/or first end 38 of second range 36. End stop 90 may, for example, be configured to rotate about a third axis 94. End stop 90 may include one or more of a variety of shapes, sizes, configurations, and/or materials. For example and without limitation, end stop 90 may extend substantially vertically, such as substantially in a plane defined by a longitudinal direction and a vertical direction. End stop 90 may be disposed such that an engagement portion 96 of first portion 60 of actuating lever 50 may contact end stop 90 as second track 16 moves to second end 34 of first range 30 (e.g., moves forward). End stop 90 may restrict further movement of second track 16 toward second range 36 unless actuating lever 50 is actuated, such as by being rotated by connecting member 72 (e.g., end stop 90 may limit forward movement of second track 16 to movement within first range 30 if easy adjusting assembly 22 is not activated). Engagement portion 96 may include, for example and without limitation, a forked configuration that may at least partially receive end stop 90.

In embodiments, if second track 16 is moving from second range 36 to first range 30, end stop 90 may be configured to rotate out of the path of actuating lever 50. For example and without limitation, if an engagement portion 96 of first portion 60 of actuating lever 50 is not disposed at a level above end stop 90 (see, e.g., FIGS. 2A and 8A) and contacts end stop 90 as second track 16 moves into first range (e.g., rearward), end stop 90 may rotate downward to permit continued movement of second track 16. With embodiments, end stop 90 may not materially affect rearward movement of second track 16. If easy adjusting assembly 22 is activated, actuating lever 50 may rotate upward such that engagement portion 96 may freely pass over end stop 90 in either direction (see, e.g., FIGS. 3A, 4A, 5A, 6A, and 7A).

In embodiments, end stop bracket 92 may include a projection 98 that may extend from a body 100 of end stop bracket 92 to restrict rotation of end stop 90 in at least one direction. For example and without limitation, projection 98 may prevent forward rotation (e.g., counterclockwise rotation in the embodiment generally illustrated in FIG. 2D) of end stop 90 if end stop 90 is in a design/rest position. A biasing member 102 may bias end stop 90 toward and/or into contact with projection 98.

With embodiments, such as generally illustrated in FIGS. 2A, 2D, 3A, 4A, 5A, 6A, 7A, and 8A, a track adjuster 12 may include a soft lock 110 that may be configured to non-positively and/or temporarily lock (e.g., restrict relative movement of) first track 14 and second track 16, such as at or about a second end 40 of second range 36. A soft lock 110 may include a first portion 112 that may be connected to first track 14 and/or may include a second portion 116 that may be connected to second track 16. First portion 112 may, for example and without limitation, extend from or be incorporated with end stop bracket 92 and may include a first engagement portion 118 that may be configured to engage second portion 116 of soft lock 110. First engagement portion 118 may, for example, extend outward (e.g., away from first track 14 and second track 16). Second portion 114 may extend from and/or be incorporated with a base bracket 24 that may be connected to second track 16. Second portion 114 may include a second engagement portion 118 that may be configured to engage first engagement portion 116. Second engagement portion 118 may, for example and without limitation, include a resilient material (e.g., rubber, plastic, etc.) and may contact first engagement portion 116. Contact between first engagement portion 116 and second engagement portion 118 may restrict relative movement between first track 14 and second track 16, at least to some degree, such as via friction (e.g., without positive engagement/locking). Soft lock 110 may, for example, be configured to restrict relative movement of first track 14 and second track 16 when second track 16 is disposed at or about a second/front end 40 of second range 36 (e.g., in a full front easy adjusting position). With embodiments, first track 14 may include one or more track stops 104 that may be configured to engage second track 16 at the full front easy adjusting position and prevent further forward movement. First portion 112 may be disposed closer to first track 14 than end stop 90, so engagement portion 96 of actuating lever 50 may not be aligned (e.g., laterally) to engage first portion 112.

In embodiments, such as generally illustrated in FIGS. 2B, 2C, 3B, 4B, 5B, 6B, 7B, and 8B) a track adjuster 12 may include a lock stop 54 that may be disposed in a first range 30 (e.g., a comfort range). Lock stop 54 may be rotatably connected to first track, such as via a lock stop bracket 120. For example and without limitation, lock stop 54 may be connected to first track 14 at or about a middle of first range 30. Lock stop 54 may be configured to rotate about a fourth axis 122. Lock stop 54 may include one or more of a variety of shapes, sizes, configurations, and/or materials. For example and without limitation, lock stop 54 may extend substantially vertically (e.g., substantially in a plane defined by vertical and longitudinal directions) and/or may include an angled portion 124 that may be angled vertically upward and longitudinally rearward. Angled portion 124 may include an oblique angle, such as for example and without limitation, an angle that may be about 30 degrees to about 60 degrees, and/or about 45 degrees. With embodiments, a lock stop 54 may be configured to unlock locking lever 52 from actuating lever 50. For example and without limitation, lock stop 54 may be disposed such that a portion of locking lever 52 (e.g., protrusion 84) may contact angled portion 124 as second track 16 moves toward a first end 32 of first range 30 (e.g., rearward from second range 36). With continued movement (e.g., rearward movement) of second track 16, protrusion 84 may slide up angled portion 124, which may cause protrusion 84 to move from second section 68 of slot 64 to first section 66 of slot 64. As protrusion 84 moves out of second section 68, protrusion 84 may no longer restrict movement of actuating lever 50, which may permit locking of lockset 18 (e.g., at or about lock stop 54).

In embodiments, a lock stop bracket 120 may include a projection 126 that may extend from a body 128 of lock stop bracket 120 to restrict rotation of lock stop 54 in at least one direction. For example and without limitation, projection 126 may prevent rearward rotation (e.g., counterclockwise in the embodiments generally illustrated in FIGS. 6B, 7B, and 8B) of lock stop 54 if lock stop 54 is in a design/rest position, which may cause protrusion 84 to slide up angled portion 124 instead of protrusion 84 causing rotation of lock stop 54. A biasing member 130 may bias lock stop 54 toward and/or into contact with projection 126.

With embodiments, if second track 16 is disposed in first range 30 and lockset 18 is unlocked (e.g., via actuation of actuating lever 50) to move second track 16 toward second range 36, protrusion 84 may contact a second portion 132 of lock stop 54 that may be disposed opposite from angled portion 124 and may be substantially vertical (e.g., lock stop 54 may include a generally triangular configuration). If protrusion 84 contacts second portion 116, protrusion 84 may cause lock stop 54 to rotate (e.g., clockwise) out of the path of protrusion 84, which may allow further movement of second track 16 toward second range 36 (e.g., lock stop 54 may not materially affect forward movement of second track 16).

In embodiments, end stop 90 and lock stop 54 may be disposed at opposite sides of first track 14. For example and without limitation, end stop 90 may be disposed at a first side 74 (e.g., an inner side) of first track 14 and lock stop 54 may be disposed at a second side 76 (e.g., an outer side) of first track 14. Lock stop 54 may be disposed closer to first track 14 than locking lever 52, which may be disposed closer to first track 14 than at least some of second portion 62 of actuating lever 50. For example and without limitation, in at least one relative position of first track 14 and second track 16, at least a portion of locking lever 52 may be disposed (e.g., laterally) between second portion 62 and lock stop 54.

In embodiments, one or more of first axis 56, second axis 80, third axis 94, and fourth axis 124 may be disposed in parallel with each other and/or a transverse/lateral direction (e.g., perpendicular to first track 14 and second track 16). Some or all of first axis 56, second axis 80, third axis 94, and fourth axis 124 may be different and/or offset (e.g., vertically and/or longitudinally) from each other.

It should be understood that while embodiments are disclosed in connection with a seat or as including an "easy entry" assembly or "easy entry" functionality, embodiments of the present disclosure are not limited to seating applications or easy entry applications.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

What is claimed is:

1. A track adjuster, comprising:
    a first track;
    a second track movably connected to the first track;
    a lockset connected to at least one of the first track and the second track, the lockset configured to selectively lock the first track and the second track together; and
    an easy adjusting assembly including:
        an actuating lever;
        a locking lever engaged with the actuating lever;
        a lock stop connected to the first track, the lock stop configured to engage the locking lever;
    wherein the easy adjusting assembly is configured to restrict locking of the first track and the second track by the lockset.

2. The track adjuster of claim 1, wherein the lock stop is biased to rotate about an axis perpendicular to the first track.

3. The track adjuster of claim 1, wherein the locking lever includes a protrusion extending into a slot of the actuating lever.

4. The track adjuster of claim 3, wherein the protrusion is configured to engage the lock stop.

5. The track adjuster of claim 4, wherein, in at least one relative position between the first track and the second track, a body of the locking lever is disposed at least partially between the actuating lever and the lock stop.

6. The track adjuster of claim 3, wherein the slot includes a first section and a second section, and the first section is disposed substantially perpendicular to the second section.

7. The track adjuster of claim 1, wherein the lock stop includes an angled portion angled upward and rearward at an oblique angle.

8. The track adjuster of claim 1, wherein the actuating lever, the locking lever, and the lock stop are configured to rotate about three different axes that are disposed substantially in parallel with each other.

9. The track adjuster of claim 1, wherein the lock stop is rotatably connected to a bracket fixed to the first track.

10. The track adjuster of claim 9, wherein the bracket includes a projection configured to limit rotation of the lock stop.

11. The track adjuster of claim 10, wherein the lock stop is biased into contact with the projection.

12. The track adjuster of claim 1, including an end stop rotatably connected to the first track.

13. The track adjuster of claim 12, wherein the end stop is configured to restrict movement of the second track relative to the first track in a first direction via engagement with the actuating lever, and the end stop is configured to rotate such that the end stop does not restrict movement of the second track relative to the first track in a second direction.

14. The track adjuster of claim 12, wherein the end stop is disposed at a first side of the first track and the lock stop is disposed at a second side of the first track.

15. The track adjuster of claim 1, wherein, in a first position, the locking lever does not restrict movement of the actuating lever, and, in a second position, the locking lever restricts movement of the actuating lever.

16. The track adjuster of claim 15, wherein, in the first position, a protrusion of the locking lever is disposed in a first section of a slot of the actuating lever, and, in the second position, the protrusion of the locking lever is disposed in a second section of the slot of the actuating lever.

17. The track adjuster of claim 16, wherein the first section and the second section are disposed substantially perpendicular to each other.

18. The track adjuster of claim 1, including a cable connected to the actuating lever and configured to cause rotation of the actuating lever.

19. The track adjuster of claim 1, wherein the easy adjusting assembly is configured to restrict locking of the first track and the second track in a comfort range of positions and an easy adjusting range of positions.

20. An easy adjusting assembly, comprising:
an actuating lever including a slot;
a locking lever engaged with the slot of the actuating lever; and
a rotating lock stop, the rotating lock stop including an angled portion configured to cause the locking lever to move from a first section of the slot to a second section of the slot;
wherein the locking lever is configured to restrict movement of the actuating lever to restrict locking of a track assembly in an easy adjusting range of track positions.

* * * * *